United States Patent [19]
Lim

[11] Patent Number: 5,898,466
[45] Date of Patent: Apr. 27, 1999

[54] APPARATUS FOR CORRECTING VERTICAL AND OPTICAL DISTORTIONS OF IMAGES IN PROJECTION TV SETS

[75] Inventor: Nam-kyu Lim, Suwon, Rep. of Korea

[73] Assignee: Samsung Electronics Co., Ltd., Kyungki-Do, Rep. of Korea

[21] Appl. No.: 08/668,825

[22] Filed: Jun. 24, 1996

[30] Foreign Application Priority Data

Jun. 24, 1995 [KR] Rep. of Korea ............ 95-17302

[51] Int. Cl.⁶ .................. H04N 3/23; H01J 29/56
[52] U.S. Cl. .................. 348/746; 348/806; 315/371
[58] Field of Search .................. 348/746, 747, 348/745, 806, 807; 315/371, 370, 368.21, 368.18; H04N 3/23, 3/223

[56] References Cited

U.S. PATENT DOCUMENTS

| | | | |
|---|---|---|---|
| 4,795,946 | 1/1989 | Nishiyama | 315/371 |
| 5,164,639 | 11/1992 | Shimaoka et al. | 315/368.18 |
| 5,444,338 | 8/1995 | George et al. | 315/371 |
| 5,508,593 | 4/1996 | George | 348/746 |

*Primary Examiner*—Michael Lee
*Attorney, Agent, or Firm*—Sughrue, Mion, Zinn, Macpeak & Seas, PLLC

[57] ABSTRACT

A vertical and optical distortion correction apparatus in a projection television set is provided. Thermal consumption of each convergence output end is reduced, convergence control is facilitated and a correction control time is shortened by correcting the optical and vertical distortions at each vertical output end of red, green and blue cathode ray tubes.

13 Claims, 4 Drawing Sheets

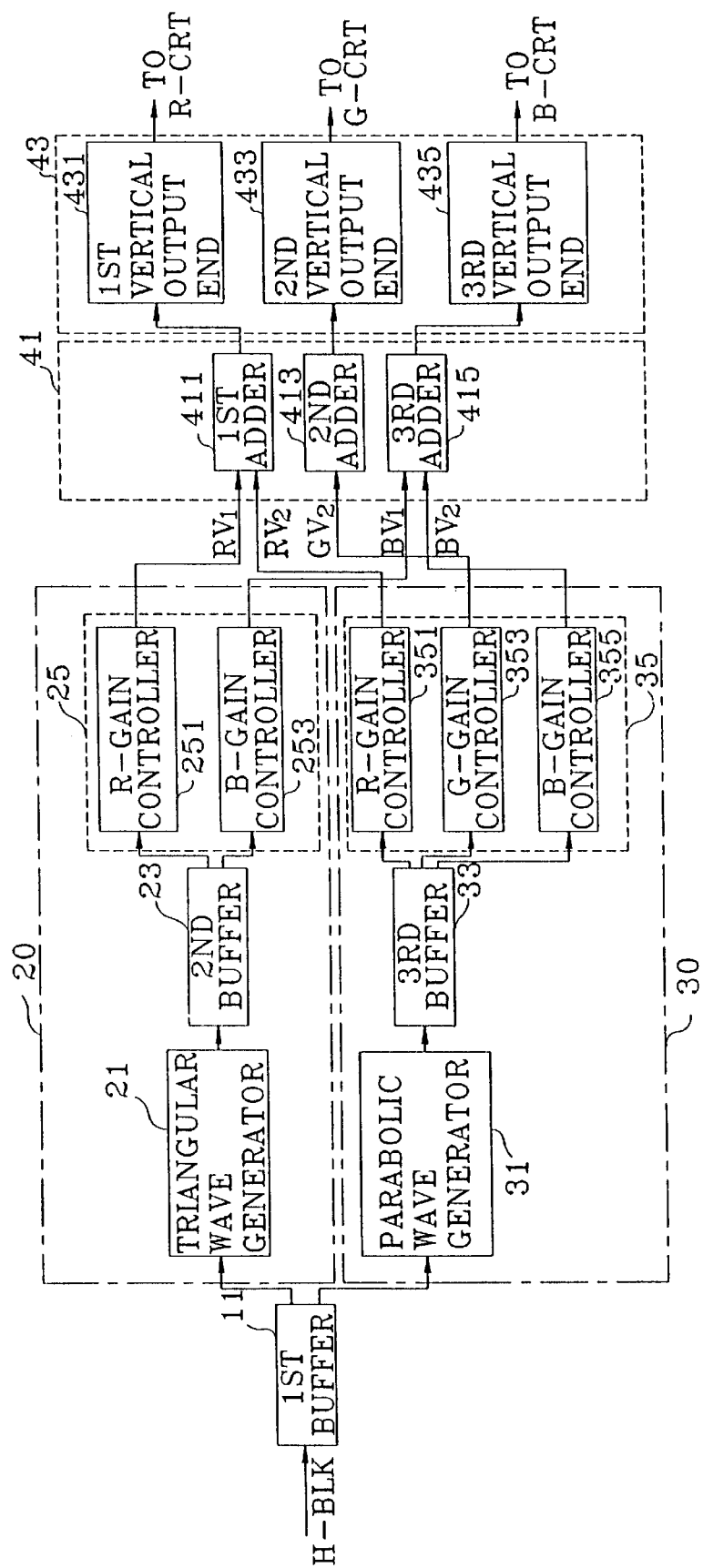

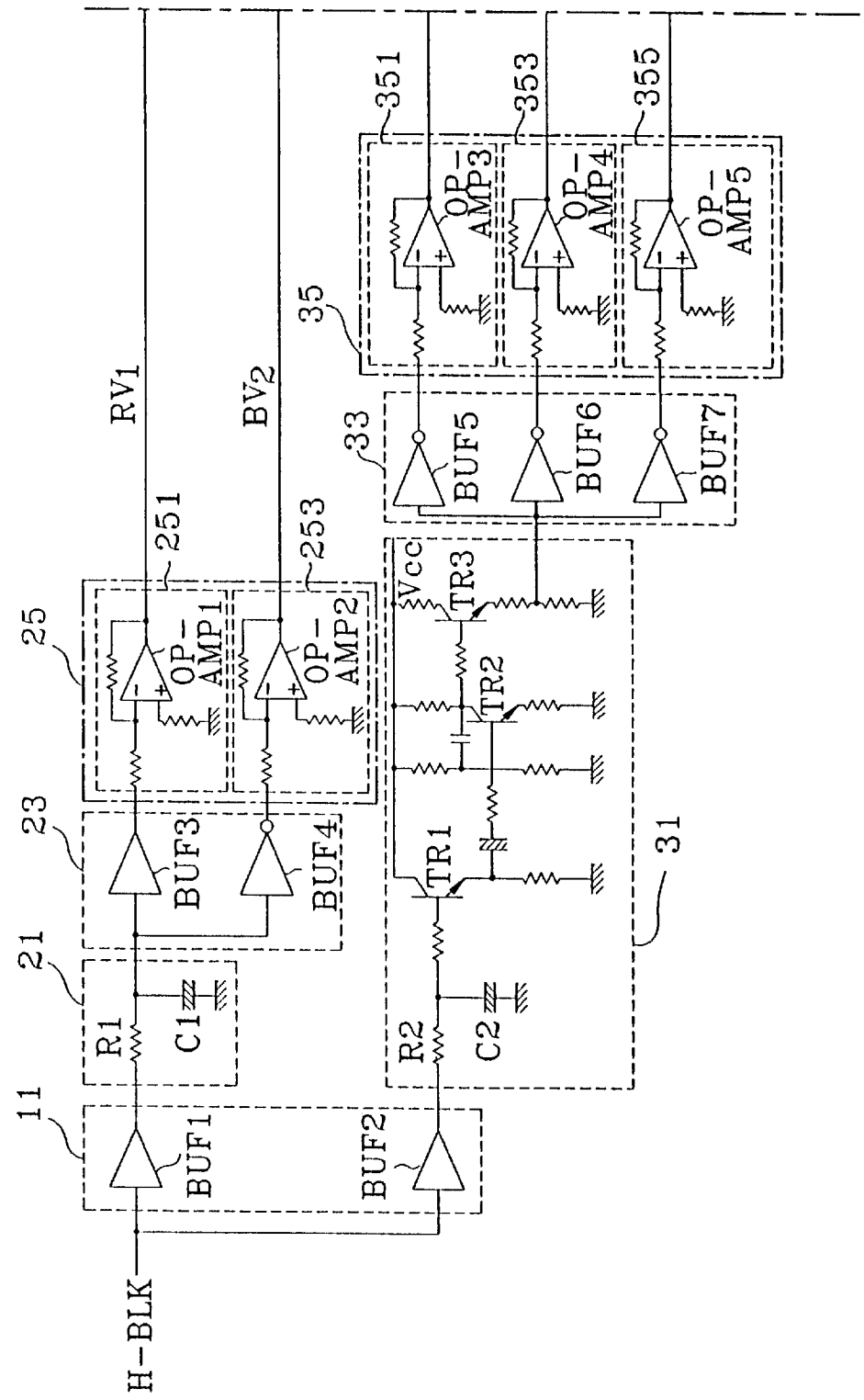

(PRIOR ART) (PRIOR ART) (PRIOR ART)

APPARATUS FOR CORRECTING VERTICAL AND OPTICAL DISTORTIONS OF IMAGES IN PROJECTION TV SETS

BACKGROUND OF THE INVENTION

The present invention relates to a vertical and optical distortion correction apparatus in a projection television set, and more particularly, to a vertical and optical distortion correction apparatus in a projection television (TV) set for correcting vertical and optical distortions while reducing thermal loss of a convergence output end and facilitating color balance control.

An existing projection TV set includes three cathode ray tubes (CRTs) for converting an electrical image signal into red, green and blue light. These CRTs have a size of seven to nine inches. The CRT for red light and the CRT for blue light are disposed to the left and right sides with respect to the CRT for green light, respectively. Each CRT includes a deflection yoke portion for deflecting an electrical beam horizontally and vertically. Thus, in case of a blue image displayed on a screen by the blue light CRT, an optical distortion due to arrangement of the three CRTs is shown in the upperleft end and lowerleft end of the image as shown in FIG. 3A, and distortion due to a deflection yoke portion (hereinafter, referred to as a "vertical distortion") is shown in the upperright end and the lowerright end of the image. In case of a green image displayed by the green light CRT, a vertical distortion of the image shows up strongly in the center-top and the center-bottom of the image as shown in FIG. 3B. In case of a red image displayed by the red light CRT, a vertical distortion of the image shows up strongly in the upperleft and the lowerleft end as shown in FIG. 3C and an optical distortion of the image shows up strongly in the upperright end and the lowerright end as shown in FIG. 3C. A digital convergence correction circuit and an analog convergence correction circuit are usually used for correcting the vertical distortion and optical distortion. These correction circuits produce voltage waveforms for correcting distortions of the red, green and blue images, and the produced voltage waveforms are supplied to convergence amplifier circuits of the red, green and blue CRTs, respectively. That is, the produced voltage waveforms are applied to a convergence yoke portion of each CRT. Each convergence yoke portion corrects the distortions according to the applied voltage waveform.

However, since heat proportional to a degree of correcting the convergence is generated in CRTs, in the case of the conventional distortion correction, a large thermal energy loss is generated. Such a problem shortens the life of the apparatus and negatively impacts the reliability of the apparatus.

SUMMARY OF THE INVENTION

To solve the above problem, it is an object of the present invention to provide a vertical and optical distortion correction apparatus in a projection television (TV) set for correcting vertical and optical distortions in which reliability with respect to convergence correction is improved by reducing thermal consumption of each convergence output end of red, green and blue CRTs, and in which productivity is improved by reducing a correction control time.

To accomplish the above object of the present invention, there is provided a vertical and optical distortion correction apparatus in a projection television (TV) set for correcting vertical and optical distortions, the vertical and optical distortion correction apparatus comprising:

optical distortion quantity calculation means for calculating a correction quantity with respect to a triangular optical distortion after receiving a horizontal blanking signal;

vertical distortion quantity calculation means for calculating a correction quantity with respect to a parabolic vertical distortion after receiving the horizontal blanking signal;

adder means for adding the calculated optical distortion correction quantity and the vertical distortion correction quantity and outputting the added result to each vertical output end of red (R), green (G) and blue (B) CRTs; and vertical output portion for applying current to each vertical deflection yoke of the R, G and B CRTs according to the signal output from the adder means.

BRIEF DESCRIPTION OF THE DRAWINGS

The preferred embodiment is described with reference to the drawings wherein:

FIG. 1 is a block diagram of a vertical and optical distortion correction apparatus in a projection TV according to a preferred embodiment of the present invention.

FIGS. 2A and 2B are detailed circuit diagrams showing the vertical and optical distortion correction apparatus of FIG. 1.

DETAILED DESCRIPTION OF THE PREFERRED EMBODIMENT

Figure 2B:
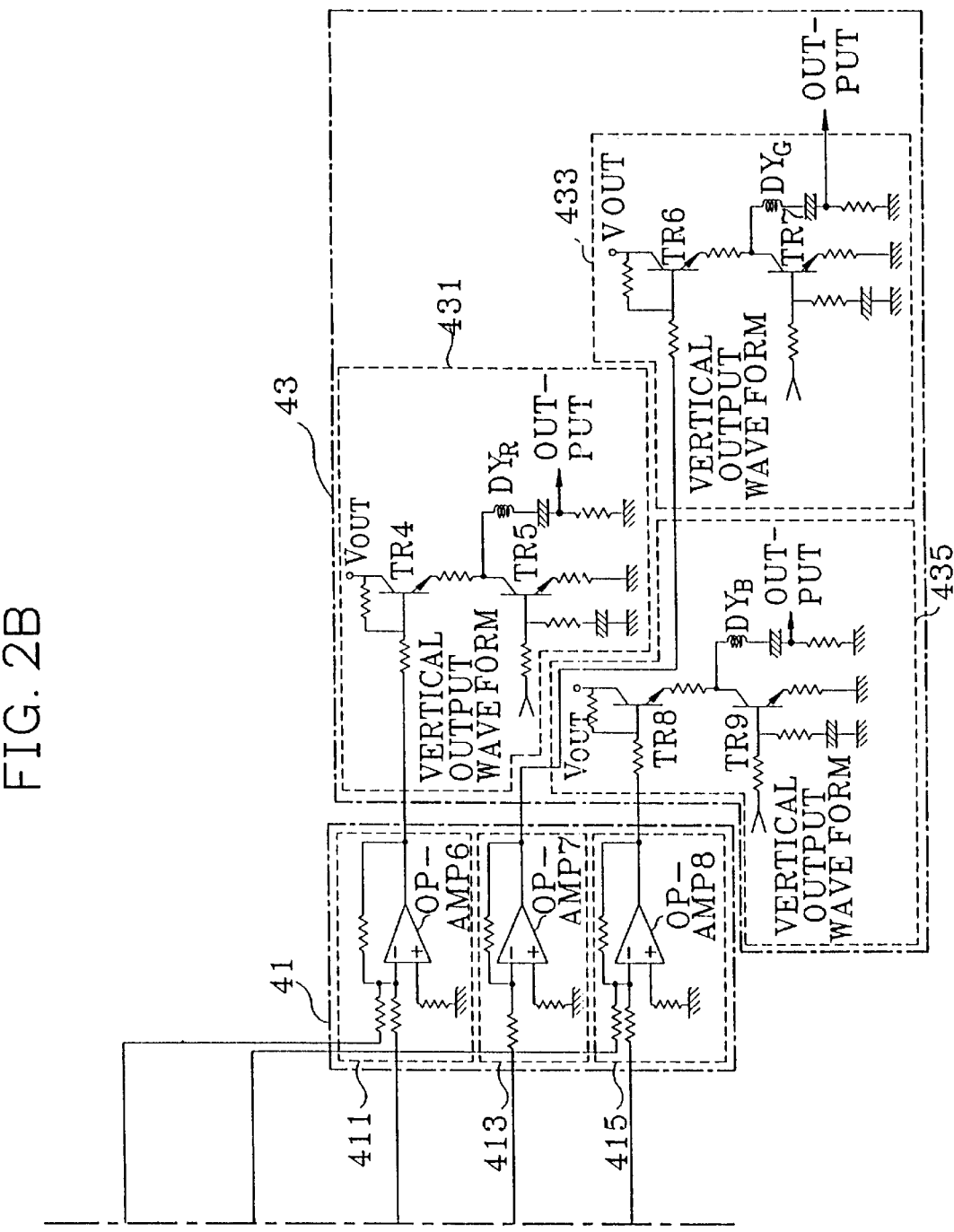

A preferred embodiment of the present invention will be described below in more detail with reference to the accompanying drawings.

As shown in FIG. 1, a vertical and optical distortion correction apparatus according to the present invention is located prior to R, G and B vertical output ends in a projection TV set. The vertical and optical distortion correction apparatus includes an optical distortion quantity calculator 20 for calculating a correction quantity with respect to a triangular optical distortion after receiving a horizontal blanking signal H-BLK via a first buffer portion 11, and a vertical distortion quantity calculator 30 for calculating a correction quantity with respect to a parabolic vertical distortion after receiving the horizontal blanking signal H-BLK via the first buffer portion 11. The optical distortion quantity calculator 20 includes a triangular wave generator 21 for generating a triangular wave signal after receiving the horizontal blanking signal H-BLK. The optical distortion quantity calculator further includes a first gain controller 25 having an R-gain controller 251 and a B-gain controller 253 which receive triangular wave signals reciprocal to each other via a second buffer 23, which is connected to the triangular wave generator 21. The gain controllers perform gain control in correspondence to the mutually reciprocal optical distortion of R and B with respect to G.

The vertical distortion quantity calculator 30 includes a parabolic wave generator 31 for generating a parabolic wave signal after receiving the horizontal blanking signal H-BLK. The vertical distortion quantity calculator further includes a second gain controller 35 having an R-gain controller 351, a G-gain controller 353 and a B-gain controller 355 which receive parabolic wave signals inverted via a third buffer 33 which is connected to the parabolic wave generator 31. The gain controllers perform gain control in correspondence to the vertical distortion of R, G and B, respectively.

The respective gain controllers 25 and 35 of the optical distortion correction quantity calculator 20 and the vertical distortion correction quantity calculator 30 are connected to an adder portion 41 including a first adder 411 for adding gain-controlled signals $RV_1$ and $RV_2$ with respect to the optical and vertical distortions of R, a second adder 413 for receiving and outputting a gain-controlled signal $GV_2$ with respect to the vertical distortion of G, and a third adder 415 for adding gain-controlled signals $BV_1$ and $BV_2$ with respect to the optical and vertical distortions of B. The adder portion 41 is connected to a vertical output portion 43 which includes three vertical output ends 431, 433 and 435 for respectively outputting the added signals to R, G and B CRTs. The vertical output ends are correspondingly connected to the three adders 411, 413 and 415.

The operation of the vertical and optical distortion correction apparatus in the projection TV according to the present invention will be described below in more detail with reference to FIGS. 2 through 4C.

Figures 3A, 3B, 3C:
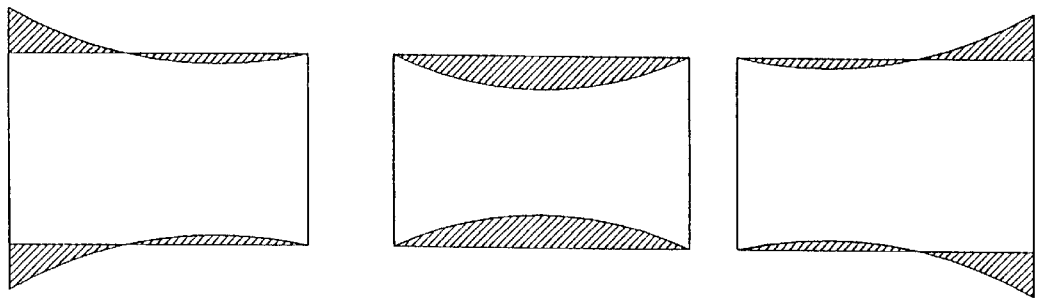
FIGS. 3A through 3C are state views for explaining the vertical and optical distortions when the light of R, G and B CRTs are projected on a screen.
Figures 4A, 4B, 4C:
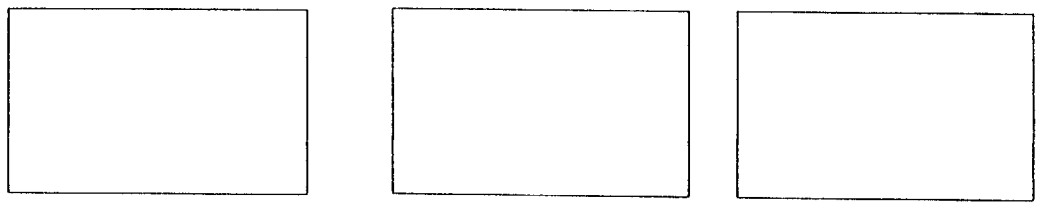
FIGS. 4A through 4C are state views showing a screen of a projection TV in which vertical and optical distortions are corrected according to the present invention.

FIGS. 2A and 2B are detailed circuit diagrams showing the vertical and optical distortion correction apparatus of FIG. 1. FIGS. 3A through 3C are state views for explaining the vertical and optical distortions when the light of R, G and B CRTs are projected on a screen. FIGS. 4A through 4C are state views showing a screen of a projection TV in which vertical and optical distortions are corrected according to the present invention.

A horizontal blanking signal H-BLK having a positive level is input to a first buffer portion 11. The first buffer portion 11 includes two buffers BUF1 and BUF2 for calculating a correction signal with respect to optical and vertical distortions, respectively, using the horizontal blanking signal H-BLK. The first buffer portion 11 is used for removing mutual influences between the horizontal blanking signals of H-BLK input to the two buffers BUF1 and BUF2, and for impedance matching. The horizontal blanking signal passing through the first buffer BUF1 in the first buffer portion 11 is input to the optical distortion correction quantity calculator 20. The horizontal blanking signal passing through the second buffer BUF2 in the first buffer portion 11 is input to the vertical distortion correction quantity calculator 30. The triangular wave generator 21 in the optical distortion correction quantity calculator 20 is comprised of an integrator having a resistor R1 and a capacitor C1 which are connected in parallel to each other, and integrates the horizontal blanking signal input via the first buffer BUF1 to be converted into a triangular waveform for correcting the optical distortion. A general optical distortion is generated since an R CRT and a B CRT are located in the left and right sides of a G CRT, while being centered on the G CRT. These distortions are shown in FIGS. 3A and 3C. As shown in FIGS. 3A and 3C, the reciprocal optical distortions in the triangular form are generated in one end of the top and bottom of the screen. Here, shaded portions need correction. The triangular wave signal is input to the second buffer portion 23. The second buffer portion 23 includes two buffers BUF3 and BUF4. Among the two buffers BUF3 and BUF4, one is an inverting buffer BUF4 to invert an input triangular wave signal and output the inverted signal and the other buffer BUF3 outputs the received triangular wave signal as is. The reciprocal triangular wave signals output from the second buffer portion 23 are input to corresponding gain controllers 251 and 253 in the first gain controller 25, respectively. An R-gain controller 251 in the first gain controller 25 is comprised of an operational amplifier OP-AMP1 in which an inverting end is an input end, a non-inverting end is grounded and the output is fed back to the input so that gain control can be performed with respect to the R where the optical distortion occurs. A B-gain controller 253 in the first gain controller 25 is comprised of an operational amplifier OP-AMP2 in which an inverting end is an input end, a non-inverting end is grounded and the output is fed back to the input so that gain control can be performed with respect to the B where the optical distortion occurs. The operational amplifier OP-AMP1 in the R-gain controller 251 gain-controls the triangular wave signal input via the buffer BUF3 by the feedback input signal and outputs the signal RV, having a correction quantity with respect to the optical distortion of the R. The operational amplifier OP-AMP2 in the B-gain controller 253 gain-controls the triangular wave signal input via the inverting buffer BUF4 by the feedback input signal and outputs the signal $BV_1$, having a correction quantity with respect to the optical distortion of the B. The signals RV, and $BV_1$ having the correction quantities with respect to the optical distortions of the R and B are input to the adder portion 41.

Meanwhile, the parabolic wave generator 31 in the vertical distortion correction quantity calculator 30 is comprised of an integrator having a resistor R2 and a capacitor C2 which are connected in parallel to each other and three transistors TR1, TR2 and TR3. The parabolic wave generator 31 integrates the horizontal blanking signal input via the buffer BUF2 to be converted into a triangular waveform according to a time constant which is determined by the resistor R2 and the capacitor C2 of the integrator. In the parabolic wave generator 31, the triangularly converted horizontal blanking signal is applied via a resistor to the base of a first transistor TR1. The first transistor TR1 slightly shapes the triangular wave signal applied to the base thereof into a parabolic wave and supplies the shaped result to the base of a second transistor TR2 whose base is connected to the emitter of the first transistor TR1. The second transistor TR2 further shapes the triangular wave signal applied to the base thereof into a parabolic wave and supplies the shaped result to the base of a third transistor TR3 whose base is connected to the collector of the second transistor TR2. At the third transistor TR3 in the parabolic wave generator 31, the parabolic wave signal applied to the base thereof is output via the emitter thereof. That is, the parabolic wave generator 31 converts the triangular wave signal obtained by the integration into the parabolic wave signal via the three transistors TR1, TR2 and TR3 in turn, and outputs the parabolic wave signal. Generally, the vertical distortion appears as the shaded parabolic pattern in the top and bottom of the screen as shown in FIG. 3B. Thus, it is necessary to produce the parabolic wave signal in order to correct the vertical distortion. The parabolic wave signal is input to a third buffer portion 33. The third buffer portion 33 has three inverting buffers BUF5, BUF6 and BUF7, each of which inverts the input parabolic wave signal and outputs the inverted signal.

The inverted three parabolic wave signals are input to corresponding gain controllers 351, 353 and 355 in the second gain controller 35, respectively. The R-gain controller 351 in the second gain controller 35 is comprised of an operational amplifier OP-AMP3 so that gain control can be performed with respect to the R where the vertical distortion occurs, in which an inverting end is an is input end, a non-inverting end is grounded and the output is fed back to the input. The G-gain controller 353 in the second gain controller 35 is comprised of an operational amplifier OP-AMP4 so that gain control can be performed with respect to the G where the vertical distortion occurs, in which an inverting end is an input end, a non-inverting end is grounded and the output is fed back to the input. The B-gain controller 355 in the second gain controller 35 is comprised of an operational amplifier OP-AMP5 so that gain control can be performed with respect to the B where the optical distortion occurs, in which an inverting end is an input end, a non-inverting end is grounded and the output is fed back to the input.

The operational amplifier OP-AMP3 in the R-gain controller 351 gain-controls the parabolic wave signal input via the inverting buffer BUF5 by the feedback input signal and outputs the signal $RV_2$ having a correction quantity with respect to the vertical distortion of the R.

The operational amplifier OP-AMP4 in the G-gain controller 353 gain-controls the parabolic wave signal input via the inverting buffer BUF6 by the feedback input signal and outputs the signal $GV_2$ having a correction quantity with respect to the vertical distortion of the G.

The operational amplifier OP-AMP5 in the B-gain controller 355 gain-controls the parabolic wave signal input via the inverting buffer BUF7 by the feedback input signal and outputs the signal $BV_2$ having a correction quantity with respect to the optical distortion of the B.

The signals $RV_2$, $GV_2$ and $BV_2$ having the correction quantities with respect to the vertical distortions of the R, G and B are input to the adder portion 41. A first adder 411 in the adder portion 41 adds the signals $RV_1$ and $RV_2$ having the correction quantities with respect to the optical distortion and the vertical distortion of the R applied from the R-gain controllers 251 and 351 in the two gain controllers 25 and 35, respectively to the inverting end of the operational amplifier OP-AMP6, and outputs the added result to the vertical output end 431 with respect to the R-CRT. A second adder 413 in the adder portion 41 receives the signal $GV_2$ having the correction quantities with respect to the vertical distortion of the G applied from the G-gain controller 353 in the second gain controller 35 to the inverting end of the operational amplifier OP-AMP7, and outputs the received result to the vertical output end 433 with respect to the G-CRT. A third adder 415 in the adder portion 41 adds the signals $BV_1$ and $BV_2$ having the correction quantities with respect to the optical distortion and the vertical distortion of the B applied from the B-gain controllers 255 and 355 in the two gain controllers 25 and 35, respectively to the inverting end of the operational amplifier OP-AMP8, and outputs the added result to the vertical output end 435 with respect to the B-CRT.

The first vertical output end 431 in the vertical output portion 43 receives the R signals $RV_1$ and $RV_2$ having the correction quantities with respect to the optical and vertical distortions to the base of a fourth transistor TR4 via a resistor. According to the signal input to the base of the fourth transistor TR4, current is applied to a vertical deflection yoke $DY_R$ of the R CRT which is connected to an output end located between the collector of a fifth transistor TR5, which receives a vertical output waveform at the base thereof, and the emitter of the fourth transistor TR4.

The second vertical output end 433 receives the G signal $GV_2$ having the correction quantity with respect to the vertical distortion to the base of a sixth transistor TR6 via a resistor. According to the signal input to the base of the sixth transistor TR6, current is applied to a vertical deflection yoke $DY_G$ of the G CRT which is connected to an output end located between the collector of a seventh transistor TR7, which receives a vertical output waveform at the base thereof, and the emitter of the sixth transistor TR6.

The third vertical output end 435 receives the B signals $BV_1$ and $BV_2$ having the correction quantities with respect to the optical and vertical distortions to the base of an eighth transistor TR8 via a resistor. According to the signal input to the base of the eighth transistor TR8, current is applied to a vertical deflection yoke $DY_B$ of the B CRT which is connected to an output end located between the collector of a ninth transistor TR9, which receives a vertical output waveform at the base thereof, and the emitter of the eighth transistor TR8.

As described above, the current is applied to the vertical deflection yokes of the R, G and B CRTs according to the signal output from the adder portion 41, thereby obtaining the corrected picture as shown in FIGS. 4A through 4C.

As described above, the present invention provides a vertical and optical distortion correction apparatus in a projection television (TV) set for correcting vertical and optical distortions. Reliability with respect to convergence correction is assured by correcting the vertical and optical distortions at the vertical output ends of the R, G and B CRTs not those of the convergence output ends to distribute thermal consumption of each convergence output end. Productivity is also improved by reducing a color balance control time and facilitating the control.

While only certain embodiments of the invention have been specifically described herein, it will apparent that numerous modifications may be made thereto without departing from the spirit and scope of the invention.

What is claimed is:

1. A vertical and optical distortion correction apparatus in a projection television (TV) set for correcting vertical and optical distortions, the vertical and optical distortion correction apparatus comprising:

optical distortion quantity calculation means for calculating an optical correction quantity with respect to a triangular optical distortion after receiving a horizontal blanking signal;

vertical distortion quantity calculation means for calculating a vertical correction quantity with respect to a parabolic vertical distortion after receiving the horizontal blanking signal;

adder means for adding the calculated optical correction quantity and the vertical correction quantity and outputting the added result to respective vertical output ends of red (R), green (G) and blue (B) CRTs; and vertical output portion for applying current to respective vertical deflection yokes of said R, G and B CRTs according to the added result output from said adder means.

2. A vertical and optical distortion correction apparatus in a projection television (TV) set according to claim 1, further comprising a first buffer portion for receiving the horizontal blanking signal and outputting the horizontal blanking signal to said optical distortion quantity calculation means and said vertical distortion quantity calculation means.

3. A vertical and optical distortion correction apparatus in a projection television (TV) set according to claim 1, wherein said optical distortion quantity calculation means comprises:

a triangular wave generator for generating a triangular wave signal after receiving the horizontal blanking signal;

a second buffer portion having a plurality of buffers, wherein one of said plurality of buffers is an inverting buffer to receive the triangular wave signal generated in said triangular wave generator and to invert the received triangular wave signal, said second buffer portion outputting the triangular wave signal and the inverted triangular wave signal; and a first gain controller receiving the triangular wave signal and inverted output triangular wave signal output from said second buffer portion and performing gain control in correspondence to mutually reciprocal optical distortion of an R image and a B image with respect to a G image to produce said optical correction quantity.

4. A vertical and optical distortion correction apparatus in a projection television (TV) set according to claim 1, wherein said vertical distortion quantity calculation means comprises:

a parabolic wave generator for generating a parabolic wave signal after receiving the horizontal blanking signal;

a third buffer portion, having a plurality of buffers, for receiving the parabolic wave signal generated in said parabolic wave generator to invert the received parabolic wave signal and outputting inverted parabolic wave signals; and a second gain controller for receiving the inverted parabolic wave signals inverted via said third buffer portion and for performing gain control in correspondence is to vertical distortion of an R image, a G image and a B image to produce said vertical correction quantity.

5. A vertical and optical distortion correction apparatus in a projection television (TV) set according to claim 3, wherein said triangular wave generator comprises an integrator having a resistor and a capacitor which are connected in parallel.

6. A vertical and optical distortion correction apparatus in a projection television (TV) set according to claim 4, wherein said parabolic wave generator comprises an integrator having a resistor and a capacitor which are connected in parallel and a plurality of transistors.

7. A vertical and optical distortion correction apparatus in a projection television (TV) set according to claim 3, wherein said first gain controller comprises two operational amplifiers so that gain control can be performed with respect to the R image and B image where optical distortion occurs, wherein in each operational amplifier an inverting end is an input end, a non-inverting end is grounded, and the output is fed back to the input.

8. A vertical and optical distortion correction apparatus in a projection television (TV) set according to claim 4, wherein said second gain controller comprises three operational amplifiers so that gain control can be performed with respect to the R, G and B image where vertical distortion occurs, wherein in each operational amplifier an inverting end is an input end, a non-inverting end is grounded, and the output is fed back to the input.

9. A vertical and optical distortion correction apparatus in a projection television (TV) set according to claim 1, wherein said optical distortion quantity calculation means comprises:

a triangular wave generator for generating a triangular wave signal after receiving the horizontal blanking signal;

a second buffer portion having a plurality of buffers, wherein one of said plurality of buffers is an inverting buffer to receive the triangular wave signal and to invert the triangular wave signal; and first gain controller receiving the triangular wave signal and inverted triangular wave signal output from said second buffer portion and performing gain control in correspondence to mutually reciprocal optical distortion of an R image and a B image with respect to a G image to produce said optical correction quantity;

wherein said vertical distortion quantity calculation means comprises:

a parabolic wave generator for generating a parabolic wave signal after receiving the horizontal blanking signal;

a third buffer portion, having a plurality of buffers, for inverting the received parabolic wave signal and outputting inverted parabolic wave signals; and a second gain controller for receiving the inverted parabolic wave signals output from said third buffer portion and for performing gain control in correspondence to vertical distortion of an R image, a G image and a B image to produce said vertical correction quantity; and wherein said adder means comprises:

a first adder for adding the signals corresponding the correction quantities with respect to the optical and vertical distortions of the R image applied from said first and second gain controllers, respectively, and for outputting the added result;

a second adder for inputting the signal having the correction quantity with respect to the vertical distortion of the G image applied from said second gain controller and for outputting the result; and a third adder for adding the signals having the correction quantities with respect to the optical and vertical distortions of the B image applied from said first and second gain controllers, respectively, and for outputting the added result, wherein said first through third adders each comprise an operational amplifier in which an inverting end is an input end, which is connected to the output of said gain controller, a non-inverting end is grounded and the output so is fed back to the input.

10. A vertical and optical distortion correction apparatus in a projection television (TV) set according to claim 9, wherein said first gain controller comprises two operational amplifiers so that gain control can be performed with respect to the R image and B image where optical distortion occurs, wherein in each operational amplifier an inverting end is an input end, a non-inverting end is grounded, and the output is fed back to the input; and wherein said second gain controller comprises three operational amplifiers so that gain control can be performed with respect to the R, G and B image where vertical distortion occurs, wherein in each operational amplifier an inverting end is an input end, a non-inverting end is grounded, and the output is fed back to the input.

11. A vertical and optical distortion correction apparatus in a television (TV) set for correcting horizontal distortion and vertical distortion, the vertical and optical distortion correction apparatus comprising:

optical distortion quantity calculation means for calculating an optical correction quantity with respect to a triangular optical signal for each of a red image signal and a blue image signal after receiving a horizontal blanking signal;

vertical distortion quantity calculation means for calculating a vertical correction quantity with respect to a parabolic vertical distortion for each of a red image signal, a blue image signal, and a green image signal after receiving the horizontal blanking signal;

adder means for adding the calculated optical distortion correction quantities and vertical distortion correction quantities for each of said red image signal, said green image signal, and said blue image signal, and outputting the added results to respective output ends of red (R), green (G) and blue (B) CRTs; and vertical output portion for applying current to respective vertical deflection yokes of said R, G, and B CRT's according to the added results output from said adder means.

12. The vertical and optical distortion correction apparatus of claim 11, wherein said optical distortion quantity calculation means comprises:
a triangular wave generator for generating a triangular wave signal after receiving the horizontal blanking signal;
a second buffer portion having a plurality of buffers, wherein one of said plurality of buffers is an inverting buffer to receive the triangular wave signal and to invert the triangular wave signal, said second buffer portion outputting the triangular wave signal and the inverted triangular wave signal; and
a first gain controller receiving the triangular wave signal and inverted output triangular wave signal output from said second buffer portion and performing gain control in correspondence to mutually reciprocal optical distortion of an R image and a B image with respect to a G image to produce said optical correction quantities, wherein said vertical distortion quantity calculation means comprises:
a parabolic wave generator for generating a parabolic wave signal after receiving the horizontal blanking signal;
a third buffer portion, having a plurality of buffers, for receiving the parabolic wave signal generated in said parabolic wave generator to invert the received parabolic wave signal and outputting inverted parabolic wave signals; and second gain controller for receiving the inverted parabolic wave signals inverted via said third buffer portion and for performing gain control in correspondence to vertical distortion of an R image, a G image and a B image to produce said vertical correction quantities; and wherein said adder means comprises:
a first adder for adding the signals corresponding the correction quantities with respect to the optical and vertical distortions of the R image applied from said first and second gain controllers, respectively, and for outputting the added result;
a second adder for inputting the signal having the correction quantity with respect to the vertical distortion of the G image applied from said second gain controller and for outputting the result; and
a third adder for adding the signals having the correction quantities with respect to the optical and vertical distortions of the B image applied from said first and second gain controllers, respectively, and for outputting the added result,
wherein said first through third adders each comprise so an operational amplifier in which an inverting end is an input end, which is connected to the output of said gain controller, a non-inverting end is grounded and the output is fed back to the input.

13. The vertical and optical distortion correction apparatus of claim 12, wherein said first gain controller comprises two operational amplifiers so that gain control can be performed with respect to the R image and B image where optical distortion occurs, wherein in each operational amplifier an inverting end is an input end, a non-inverting end is grounded, and the output is fed back to the input; and wherein said second gain controller comprises three operational amplifiers so that gain control can be performed with respect to the R, G and B image where vertical distortion occurs, wherein in each operational amplifier an inverting end is an input end, a non-inverting end is grounded, and the output is fed back to the input.

* * * * *